United States Patent [19]

Charbeneau

[11] Patent Number: 4,796,565
[45] Date of Patent: Jan. 10, 1989

[54] PET TRANSPORTING, RESTRAINING AND EXERCISING ASSEMBLY

[76] Inventor: Rodney P. Charbeneau, 2909 Oakdale, Grand Prairie, Tex. 75050

[21] Appl. No.: 69,800

[22] Filed: Jul. 6, 1987

[51] Int. Cl.⁴ .................... A01K 15/02; A01K 29/00
[52] U.S. Cl. ..................................... 119/101; 119/96; 119/102; 280/290
[58] Field of Search ............... 119/17, 96, 98, 101, 119/102; 280/31, 290

[56] References Cited

U.S. PATENT DOCUMENTS

| | | | |
|---|---|---|---|
| 720,725 | 2/1903 | Moffitt | 119/102 X |
| 741,873 | 10/1903 | Barcus | 119/98 X |
| 758,123 | 4/1904 | Weis | 119/96 |
| 2,423,311 | 7/1947 | Griffin | 296/36 |
| 2,851,186 | 9/1958 | Rupe, Jr. | 220/114 |
| 2,976,840 | 3/1961 | Hugus | 119/1 |
| 3,399,654 | 9/1968 | Schroer | 119/96 |
| 3,463,504 | 8/1969 | Petry et al. | 280/31 |
| 3,524,655 | 8/1970 | Ballenger | 280/47.38 |
| 3,621,819 | 11/1971 | Hooper | 119/102 |
| 4,349,210 | 9/1982 | Rutt | 280/47.21 |

FOREIGN PATENT DOCUMENTS 22301 of 1910 United Kingdom ............... 119/102

*Primary Examiner*—Robert P. Swiatek
*Attorney, Agent, or Firm*—Henderson & Sturm

[57] ABSTRACT

The combination of a wheeled transport unit (10) and a restraining member (50) to provide a pet transporting, restraining and exercising assembly; wherein, the wheeled transport unit (10) comprises a base member (11) having a large opening (20); a front (13) and rear (14) wheel assembly; a cage member (15) having a hinged member (16); a handle member (17); a panel member (12) associated with the base member (11) and movable from a position covering the opening (20) in the base member (11) whereby a domestic pet (100) may be confined in an ambulatory relationship relative to the wheeled transport unit (10); and, wherein the restraining member (50) comprises a harness apparatus (51) having a plurality of attachment elements (55) that are adapted to be connected either to the cage member (15) of the wheeled transport unit (10) or to one another in a variety of harness handle configurations depending upon whether or not the wheeled transport unit (10) and the restraining member (50) are to be used together or apart from one another.

5 Claims, 2 Drawing Sheets

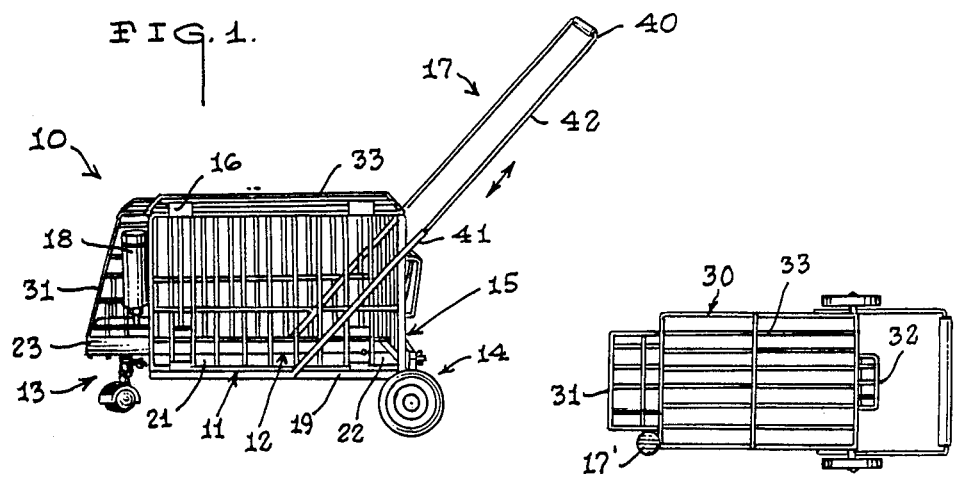
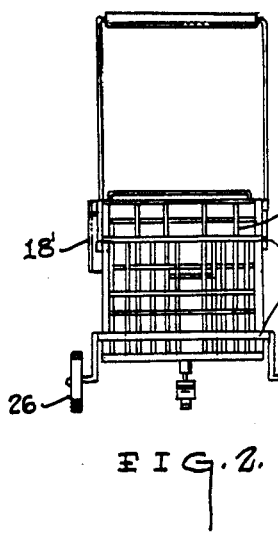
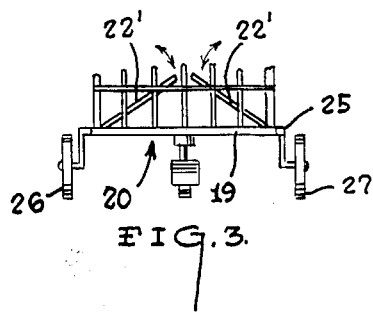
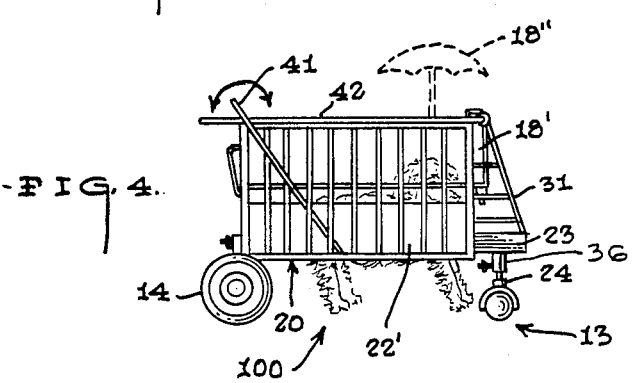
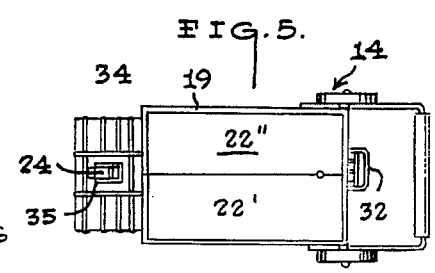

PET TRANSPORTING, RESTRAINING AND EXERCISING ASSEMBLY

TECHNICAL FIELD

This invention relates generally to the field of wheeled apparatus for transporting small domestic four legged animals.

BACKGROUND OF THE INVENTION

This invention was the subject matter of DDP Registration No. 159555 filed in the U.S. Patent and Trademark Office on Nov. 21, 1986.

As can be seen by reference to the following U.S. Pat. Nos. 4,349,210; 3,524,655; 2,423,311; and, 2,851,186 the prior art is replete with myriad and diverse wheeled apparatus for transporting a variety of animate and inanimate objects such as children, livestock, groceries, etc.

While the aforementioned prior art constructions are more than adequate for handling and transporting the objects and items for which they were specifically developed, very few of these devices are designed or intended to serve as a multi-purpose transport apparatus that can handle a wide variety of objects.

Despite the fact that at least one of the acknowledged prior art devices was developed to transport fairly large livestock such as calves, there is a pronounced paucity of wheeled transport apparatus constructed specifically to transport smaller domestic four legged animals such as pets. In addition none of the aforementioned prior art devices provides a pet transport apparatus that can also be used as a pet exercising apparatus as well as being adaptable to other non-pet related purposes.

In addition, none of the prior art constructions envisions the use of a restraining means in combination with the basic exercise and transport apparatus; wherein, the restraining means provides a harness arrangement for the pet, which will serve the dual function of operatively connecting the pet to the transport apparatus in one embodiment whereby the pet may provide locomotion to the transport apparatus; or, in an alternative embodiment the harness arrangement may be used to restrain and/or transport the pet outside of the confines of the apparatus.

Obviously there has existed a long felt need in this area of technology for an improved multi-purpose wheeled transport apparatus that would address the aforementioned prior art shortcomings; and, the apparatus that forms the basis of the present invention was developed specifically to provide a solution to inherent deficiencies found in the prior art constructons.

SUMMARY OF THE INVENTION

The present invention comprises in general a multi-purpose wheeled transport unit, which though designed primarily to function as a pet carrier can also be used as an exercise apparatus for the pet, as well as a wheeled shopping cart. In addition, this invention further comprises a restraining means which though specifically designed to be used in combination with the wheeled transport unit, may also function independently of the transport unit to provide a combined harness/carrier apparatus.

Briefly stated, the wheeled transport unit comprises a rear wheel assembly and a front wheel assembly which are operatively connected to a base member; wherein, the base member is provided with at least one movable floor panel member that in one mode of operation will uncover an enlarged opening in the base member.

In addition the base member is operatively connected to a cage member having hinged means that permit the insertion and removal of both animate and inanimate objects within the confines of the cage member. Furthermore, the base member is also operatively connected to a collapsible handle member; and, the cage member is adapted to support a wide variety of pet accessories contemplated for use in conjunction with the wheeled transport unit.

In the one mode of operation mentioned above, the wheeled transport unit is employed as a pet exercising apparatus, wherein the floor panel member is moved to expose the enlarged opening in the base member. As a consequence when a pet is placed within the cage member, the animals feet will come in direct contact with the ground; whereby, the pet can walk at a speed matching the movement of the wheeled transport unit. Not only does this mode of operation allow the pet to be exercised without the benefit of a leash; but in areas wherein the pet is potentially at risk from other animals, this arrangement provides a measure of security that cannot even be approached by more conventional exercising techniques.

It should be noted that the restraining means of this invention may also be operatively deployed in the aforementioned one mode of operation of the wheeled transport unit. As mentioned previously the restraining means comprises a harness assembly that is adapted to be secured to both the pet and at least one structural component of the wheeled transport unit; whereby, the operative connection between the harness assembly and the wheeled transport unit allows the pet to move the wheeled transport unit in any direction and at any speed.

It should also be noted that the harness apparatus of this invention is also adapted to function apart from the wheeled transport unit of this invention; whereby in one mode of deployment the harness apparatus functions as a unique multiple connection harness member for attachment to a pet lead; and in another mode of deployment the harness apparatus functions as a unique multiple connection carrier sling for transporting the pet from one location to another.

It should further be noted that the harness apparatus of this invention may also be selectively deployed within the wheeled transport unit to both restrain and support a pet in a partially suspended relationship relative to the ground. In this specific instance the partial suspension of the pet is particularly useful when the pet has incurred an injury or suffers from arthritis in one or more of its legs; whereby, the pet is able to obtain exercise without placing any weight on the afflicted limb or limbs.

In the other preferred mode of operation, the floor panel is moved to cover the opening in the base member and function as the floor of the unit. In this mode of operation the animal is both supported and confined within the unit for transportation from one location to another. In addition, the act of transporting the animal may be accomplished either by pushing on the handles of the unit, or by physically supporting the unit in, or on, another wheeled means of transportation such as a motor vehicle, bicycle, or the like.

It should also be appreciated that in the last mentioned mode of operation the unit can be converted into a shopping cart by pivoting the hinged means on the cage member into the open position so that groceries or similar items may be inserted within the confines of the cage member.

BRIEF DESCRIPTION OF THE DRAWINGS

These and other objects, advantages, and novel features of the invention will become apparent from the detailed description of the best mode for carrying out the preferred embodiment of this invention which follows; particularly when considered in conjunction with the accompanying drawings, wherein:

FIG. 1 is a perspective view of the wheeled transport unit of this invention;

FIG. 2 is a rear plan view of the unit;

FIG. 3 is an enlarged detail view of the lower portion of the unit;

FIG. 4 is a side plan view of the unit;

FIG. 5 is a bottom plan view of the unit;

FIG. 6 is a top plan view of the unit;

BEST MODE FOR CARRYING OUT THE INVENTION

Figure 7:
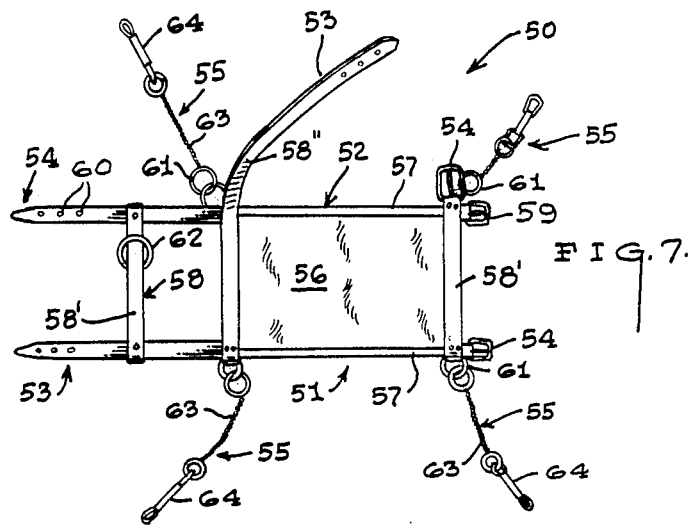
FIG. 7 is an enlarged isolated view of the harness assembly of this invention.

As can be seen by reference to the drawings and in particular to FIG. 1, the wheeled transport unit that comprises the first major component of the present invention is designated generally by the reference numeral (10). The wheeled transport unit (10) comprises in general: a base member (11); a panel member (12); a front wheel assembly (13); a rear wheel assembly (14); a cage member (15); hinged means (16); a handle member (17); and a plurality of accessory items (18). As can best be seen by reference to FIG. 7, the restraining member that comprises the second major component of this invention is designated generally by the reference numeral (50). The restraining member (50) comprises in general a harness apparatus (51) including: a body harness member (52); a plurality of interconnected strap elements (53) provided with cooperating securing means (54); and, at least one attachment element (55) for operatively connecting the restraining means (50) to the wheeled transport unit (10). The aforementioned structural features of the units (10) and (50) will now be described in seriatim fashion.

As can best be seen by reference to FIG. 5, the base member (11) comprises a generally rectangular rigid framework (19) defining an enlarged generally rectangular opening (20); wherein, the framework (19) is provided with a movable panel member (21) comprising at least one floor panel element (22), that extends across the opening (20) to form a floor for the base member (11).

In the preferred embodiment illustrated in the drawings, the movable panel member (21) comprises a plurality of panel elements (22')(22") which are pivotally connected to the base member (11) in a well recognized manner, such that the floor panel elements (22')(22") may be pivoted upwardly as depicted in FIGS. 3 and 4. However, it should also be appreciated that a single enlarged panel element (22) could be substituted, for the dual panel arrangement illustrated. In keeping with the teachings of this invention, it is only necessary that the movable panel member (21) be capable of translation to a position whereby the enlarged opening (20) is exposed to allow ambulatory movement of an animal on the terrain beneath the transport unit.

In one form of the preferred embodiment of this invention depicted in FIGS. 1 and 4, the base member (11) is provided with a forwardly extending integral shelf element (23) which is operatively connected to the front wheel assembly (13). The front wheel assembly (13) in turn comprises a removable wheel element (24) detachably secured to the bottom of the base member shelf element (23). In another form of the preferred embodiment, the front wheel assembly (13) also comprises a removable wheel element (24); however, in this embodiment the front wheel assembly (13) is operatively and detachably secured to a portion of the cage member (15) as will be explained presently.

As can best be appreciated by reference to FIGS. 2 and 3, the rear wheel assembly (14) comprises an elongated axle member (25) provided with a pair of wheel elements (26) and (27) on each end. The axle member (25) is operatively connected to the rear of the base member framework (19). In addition, this invention further contemplates that the pair of wheel elements (26) and (27) of the rear wheel assembly (14) will either be removably attached to the ends of the axle member (25); or in the alternative, the axle member (25) will be pivotally mounted relative to the base member framework (19), such that the rear wheel assembly (14) may be retracted into an inoperative position.

It should be appreciated at this juncture that the removable and/or retractable features of the front (13) and rear (14) wheel assemblies are provided to facilitate the storage of the transport unit (10) on or within another wheeled mechanism such as an automobile, bicycle, or the like.

As can be seen by reference to FIGS. 1, 2, 4 and 6, the cage member (15) comprises a generally rectangular main cage element (30); wherein, the front portion of the main cage element (30) is provided with an extension cage element (31) which projects outwardly and downwardly with respect to the main cage element (30); and, the rear portion of the main cage element (30) is provided with a wire receptacle element (32). In addition, the top portion of the main cage element (30) is provided with hinge means (16) comprising at least one hinged cage lid panel (33); whereby the top of the cage may be opened in a well recognized manner for the insertion of both inanimate and animate objects.

At this juncture it should be noted that in the embodiment depicted in FIGS. 1 and 4, the extension cage element (31) is fixedly secured to the integral shelf element (23) of the base member (11). In the embodiment illustrated in FIG. 5, the extension cage element (31) is formed integrally around its periphery with the main cage element (30); wherein the bottom of the extension cage element (31) provides support for a separate tray member (34) that is dimensioned to be removably received within the extension cage element (31).

In the latter embodiment depicted in FIG. 5 the extension element (31) is also provided with a mounting plate (35) having a downwardly projecting cylindrical element (36) that is adapted to releasably receive the removable wheel element (24) of the front wheel assembly (13).

As shown in FIGS. 1 and 4, the handle member (17) comprises a two piece collapsible handle element (40);

wherein the bottom portion (41) of the handle element is rigidly secured to the cage member (15) and/or the base member (11), and the top portion (42) is movably disposed with respect thereto. In the embodiment illustrated in FIG. 1 the top portion (41) telescopes within the bottom portion (42) of the handle element (40); and, in the embodiment of FIG. 4 the top portion (42) pivots relative to the bottom portion (41) of the handle element.

As mentioned earlier in the specification the wheeled transport unit (10) is adapted to support a variety of accessory items (18). Examples of some of these accessory items (18) such as water bottle (18') and an umbrella (18") are depicted in the drawings; while other accessory items (18) such as a cushioned pad, rain cover and the like have been left out of the drawings for the purpose of clarity.

As shown in FIG. 7, the restraining member (50) comprises a harness apparatus (51) including: a body harness member (52); a plurality of interconnected strap elements (53) provided with cooperating securing means (54); and, a plurality of attachment elements (55) for operatively connecting the restraining means (50) to the wheeled transport unit (10).

The body harness member (52) comprises a generally rectangular body encircling element (56) which is dimensioned to support and at least partially encircle the underside of a pet's torso. The plurality of interconnected strap elements (53) comprise at least two horizontally oriented and generally parallel strap members (57) and at least two vertically oriented and generally parallel strap members (58) as viewed in FIG. 7.

In the preferred embodiment of the invention illustrated in FIG. 7, the interconnected strap elements (53) comprise in part three vertically oriented and generally parallel strap members (58); wherein, the outboard vertically oriented strap members (58') terminate proximate the outer periphery of the horizontally oriented strap members (57), while the intermediate vertically oriented strap member (58") projects a substantial distance beyond the periphery of the upper horizontally oriented strap member (57).

The cooperating securing means (54) comprise a well-recognized belt buckle arrangement wherein one end of the strap elements (53) is provided with a buckle member (59) and the other end of the strap element (53) is provided with a plurality of spaced holes (60). The aforementioned cooperating securing means (54) are further disposed on the opposite ends of the horizontally oriented strap members (57) and on the upper end of both the intermediate vertically oriented strap member (58") and the right hand vertically oriented outboard strap member (58') as viewed in FIG. 7.

Still referring to FIG. 7, it can be seen that the intermediate and right hand vertically oriented strap members (58"), (58') and the horizontally oriented strap members (57) are secured to the periphery of the generally rectangular body encircling element (56). In addition the four corners of the body encircling means (56) are provided with securing ring elements (61) and another ring element (62) is movably disposed on the left hand vertically oriented outboard strap member (58').

The attachment elements (55) are operatively connected to the four corners of the body encircling element (56); wherein, each of the attachment elements (55) comprise a flexible tether member (63) secured on one end to one of the plurality of securing ring elements (61) and provided on their other end with a releasable clip member (64).

As mentioned previously the harness apparatus (51) of this invention may be employed in a variety of modes both in combination with, and apart from, the wheeled transport unit (10) of this invention. However, in all of the various modes of deployment the harness apparatus (51) will maintain a basic operative relationship relative to the users pet (100).

Figure 8:
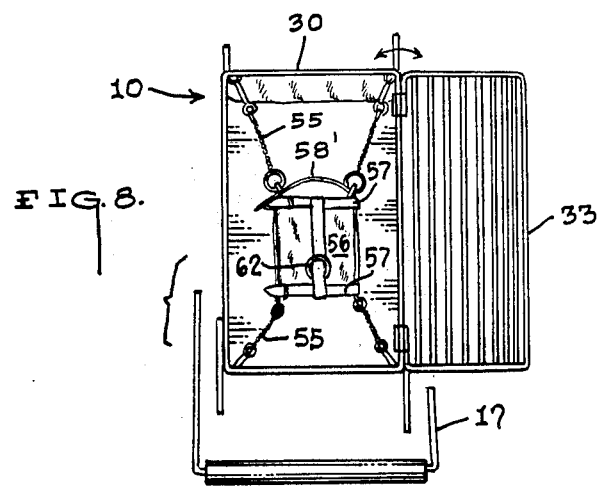
FIG. 8 is a top plan view of the harness assembly operatively attached to the wheeled transport unit; and, FIG. 9 is an enlarged detail view of the harness assembly operatively attached to both a pet and the wheeled transport unit.
Figure 9:
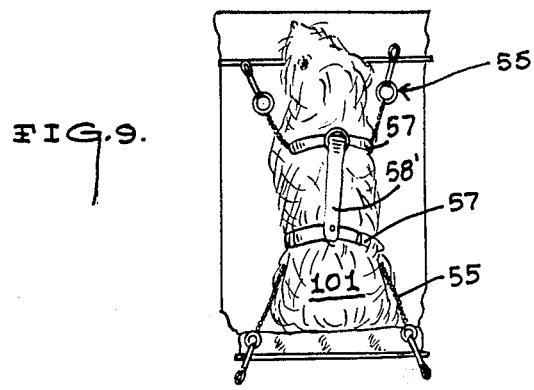

As can best be appreciated by reference to FIGS. 8 and 9, the harness apparatus (51) in its operative disposition completely surrounds the pet's torso, wherein the body encircling element (56) is disposed beneath the pet, and the horizontal strap members (57) complete the encirclement of the animal's torso. In addition, the outwardly extending portion of the intermediate vertical strap member (58") forms the chest and foreleg encircling portion of the harness apparatus (51) to captively retain the animal (100) relative to the restraining means (50).

Once the basic attachment of the harness apparatus (51) to the pet (100) has been effected, the attachment elements (55) of the restraining member (50) may be deployed relative to the wheeled transport unit (10) in a variety of ways to produce different results. In the preferred mode of deployment illustrated in FIGS. 8 and 9, the attachment elements (55) are connected at spaced locations proximate the mid-level height of the main cage element (30); wherein, the attachment elements (55) may be releasably connected to either a vertical or horizontal crossbar of the main cage element (30).

In the preferred embodiment of the invention depicted in FIG. 8, the pet (100) is confined within the harness apparatus (51) which in turn has a multiple point operative attachment to a plurality of the vertical walls of the main cage element (30). By virtue of this particular arrangement, the pet (100) may exert multi-axial forces on the wheeled transport unit (10), such that the transport unit (10) will be guided by the pet's own random movements in the absence of a counter-acting controlling force being applied to the wheeled transport unit (10) by the pet owner (not shown).

It should be appreciated at this juncture that in the previously mentioned alternate embodiment of this invention (not shown); wherein, only one of the rearwardly extending plurality of attachment elements (55) need be operatively connected between the harness apparatus (51) the wheeled transport unit (10); whereby the forward movement of the pet (100) will produce a simultaneous forward movement of the wheeled transport unit (10), the operative connection between the one rearwardly extending attachment element (55) and the wheeled transport unit (10) should occur proximate the midpoint of the rear vertical wall portion of the main cage member (30).

It should also be appreciated that in this last mentioned instance, the pet induced movement and steering of the wheeled transport unit (10) would be greatly enhanced if both of the rearwardly extending attachment elements (55) were attached to the rear vertical wall portion of the wheeled transport unit (10) at the approximate locations depicted in FIG. 8.

It should further be appreciated that in the instances wherein one or more of the pet's limbs are to be supported out of contact with the ground, while the remaining limbs retain periodic contact with the ground to exercise the animals healthy appendages, it is only necessary to secure the attachment elements (55) adjacent the afflicted limbs of the pet to the overlying portion of the cage lid panel (33) disposed above the limb or limbs to be supported.

As mentioned previously the restraining member (50) may be employed independently of the wheeled transport unit (10) of this invention; and, the deployment of the attachment elements (55) of the restraining member (50) may assume diverse configurations and perform various functions with respect to the harness apparatus (51) and the pet (100).

In one mode of deployment the forwardly extending attachment elements (55) are connected together to form a forward handle member; and, the rearwardly extending attachment elements (55) are connected in like fashion to form a rear handle member. In another mode of deployment, the front and rear attachment elements (55) on each side of the harness apparatus (51) are connected together to form side handles for the restraining means. In still another mode of deployment the front and rear attachment elements (55) are connected in a criss-cross handle fashion across the top of the harness apparatus, and each of the diagonally connected attachment elements (55) may either be threaded through, or pass over, the securing ring element (62) that is centrally disposed on the assembled harness apparatus (51).

In all of the aforementioned embodiments, the harness apparatus (51) can function as a pet carrier by virtue of the diverse handle configurations produces by the selective connection of the attachment elements. In addition, the harness apparatus (51) can also function in the manner of a conventional pet body harness by attaching a conventional animal lead (not shown) to the securing ring element (62) on the harness apparatus. In an alternate arrangement, all of the attachment elements (55) may be connected directly to the conventional animal lead to produce a multi-point attachment of the conventional animal lead to the harness apparatus (51) of this invention.

Having thereby described the subject matter of this invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. The combination of a wheeled transport unit and a harness apparatus for exercising, transporting and protecting small domestic four legged pets wherein the combination comprises:
    a wheeled transport unit including a base member having an enlarged opening and further provided with a front and rear wheel assembly wherein at least the front wheel assembly is removably mounted on the base member; and,
    said rear wheel assembly comprises an elongated axle member provided with a pair of wheel elements; wherein, the axle member is movable secured to said base member such that said pair of wheel elements may be disposed in a retracted position relative to the longitudinal axis of the transport unit;
    a cage member mounted on said base member and provided with a movable cage panel;
    a panel member operatively associated with said base member and comprising at least one movable floor panel member capable of translation within the cage member to a position whereby the enlarged opening in said base member is exposed; and,
    a harness apparatus operatively associated with said wheeled transport unit wherein said harness apparatus includes a generally rectangular body harness member; a plurality of strap elements attached to the body harness member and provided with cooperating securing means; and, a plurality of attachment elements secured to the body harness member; wherein, the harness apparatus is adapted to captively surround the torso of a pet; and, at least one of the plurality of attachment elements is adapted to releasably engage the cage member of the transport unit; whereby, the movement of the pet within the body harness may be transmitted via said at least one attachment element to impart movement to the wheeled transport unit, when the at least one movable floor panel has been raised to allow the feet of the domestic pet to extend through said enlarged opening in the base member of the wheeled transport unit.

2. The combination as in claim 1 wherein the plurality of attachment elements comprise attachment elements on the front, rear, and both sides of the harness apparatus.

3. The combination as in claim 2 wherein the plurality of attachment elements are secured on one end proximate the four corners of the generally rectangular body harness member.

4. The combination as in claim 3 wherein opposed pairs of said plurality of attachment elements are adapted to be secured together to form carrying handles for said harness apparatus.

5. The combination as in claim 2 wherein said harness apparatus is further provided with at least one securing ring element that is operatively associated with one of said plurality of strap elements.

* * * * *